United States Patent [19]

Hamren

[11] Patent Number: 4,724,702

[45] Date of Patent: Feb. 16, 1988

[54] LPP SENSOR INTERFACE CIRCUIT

[75] Inventor: Glen C. Hamren, Greentown, Ind.

[73] Assignee: General Motors Corporation, Detroit, Mich.

[21] Appl. No.: 939,182

[22] Filed: Dec. 8, 1986

[51] Int. Cl.[4] ............................................. G01M 15/00
[52] U.S. Cl. ......................................... 73/115; 330/282
[58] Field of Search ................... 73/115, 35; 123/494; 330/260, 282

[56] References Cited

U.S. PATENT DOCUMENTS 4,406,265 9/1983 Brandt et al. .
4,481,925 11/1984 Karau et al. .
4,491,010 1/1985 Brandt et al. .
4,620,438 11/1986 Howng .............................. 73/115 X Primary Examiner—Jerry W. Myracle
Attorney, Agent, or Firm—Robert M. Sigler

[57] ABSTRACT

A low impedance interface circuit for use with an internal combustion engine between a capacitive piezoelectric combustion pressure sensor and LPP signal processing circuitry comprises an operational amplifier with a negative feedback capacitor and an input DC blocking capacitor, a voltage follower amplifier with a first resistor at its input and a second resistor at its output connecting it in parallel with the feedback capacitor, a DC filter capacitor connected to the input of the voltage follower amplifier and forming a low pass filter with the first resistor to maintain a substantially constant DC voltage equal to the DC operating voltage for DC feedback, a current source controlled by the output of the operational amplifier and connected in series with the first resistor to provide increased current for the charging of the DC filter capacitor and a diode bypassing the first resistor to allow fast charging of the DC filter capacitor and DC blocking capacitor during startup.

2 Claims, 5 Drawing Figures

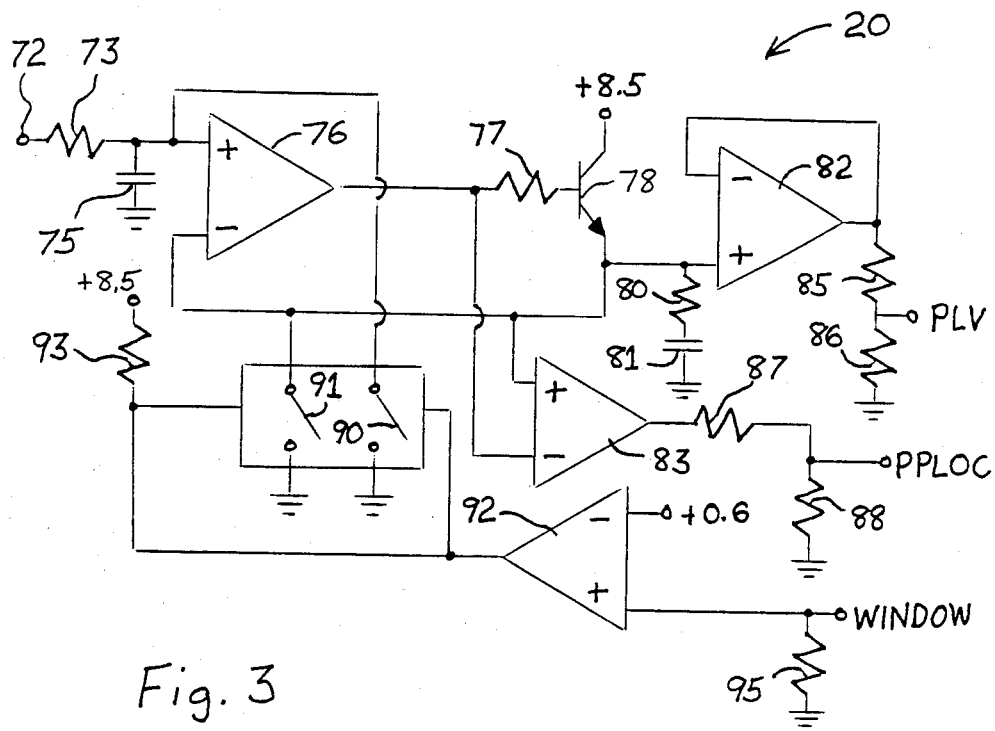
Fig. 3
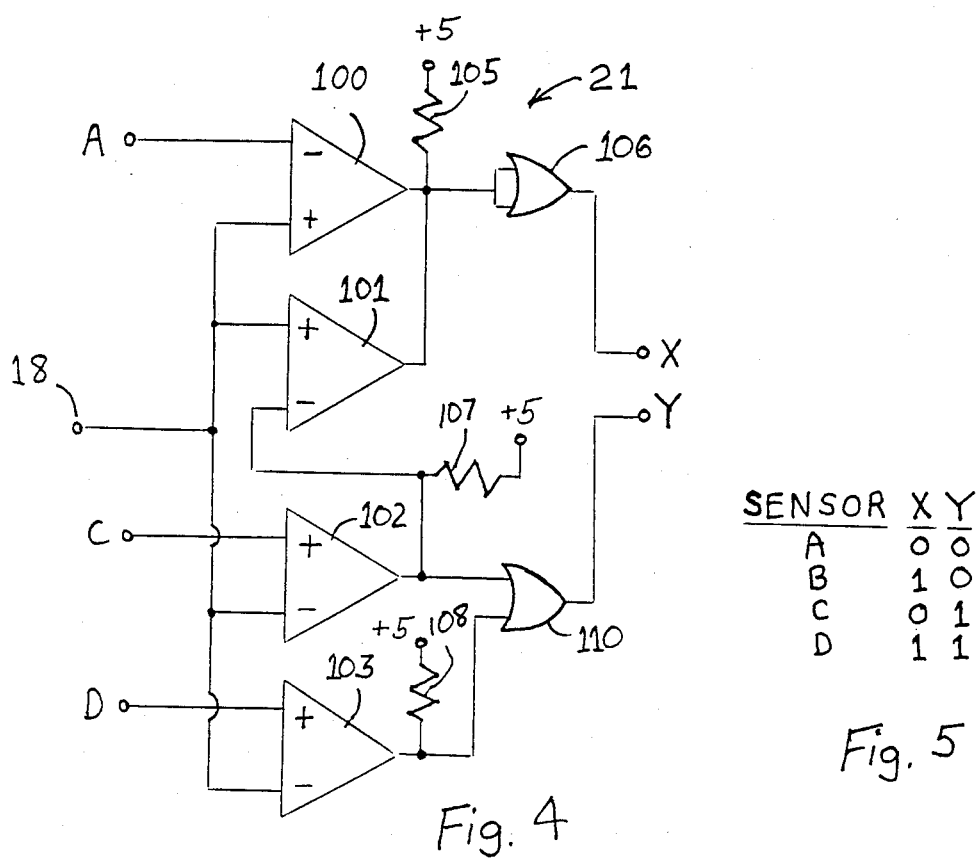
Fig. 4
Fig. 5

LPP SENSOR INTERFACE CIRCUIT

BACKGROUND OF THE INVENTION

This invention relates to an interface circuit including a capacitive piezoelectric combustion pressure sensor for a location of peak pressure (LPP) ignition control in an internal combustion engine and particularly to such a circuit presenting a low impedance to the sensor output.

LPP ignition controls have been described which use sensors to generate a signal indicating combustion pressure and include apparatus for determining the occurrence of peak combustion pressure, relating this occurrence to a reference crankshaft rotational position and adjusting ignition timing in closed loop control to maintain the location of peak combustion pressure at a substantially constant predetermined crankshaft rotational position.

Such controls require combustion pressure sensors; and the most useful such sensors developed to date generally include a piezoelectric element as the transducer from pressure or strain to an electric voltage. Generally, a cable is required to conduct the electric output signal of the sensor to the location of the ignition control; and this cable extends through the environment of the vehicle engine compartment, which is an environment rich in sources of radio frequency interference (RFI). If the interface circuit for the sensor presents a high output impedance to the sensor, the cable becomes an antenna to pick up the RFI and degrade the signal to noise ratio of the sensor signal. This is particularly critical in the case of an LPP sensor and system, since it is necessary to detect the occurrence of a peak voltage. The high frequencies of the RFI make peak detection very difficult.

However, just decreasing the impedance of a resistive feedback buffer amplifier is not a practical solution, since it also decreases the bandwidth of the amplifier and thus allows phase shift of the higher frequencies in the combustion pressure signal voltage. Such phase shift is not permissible in a system for detecting the timing or phase of a peak signal voltage, since it shifts the apparent peak location. Therefore, the low impedance is obtained by a capacitive feedback amplifier similar to a charge amplifier. However, it is also important to preserve the low end of the bandwidth down to 0.5 Hz. The large storage and filter capacitor required to maintain a constant DC operating level and still treat 0.5 Hz as AC takes time to charge when the system starts, as does the large DC blocking capacitor required between the sensor and amplifier input because of the sensor's own capacitance.

SUMMARY OF THE INVENTION

Therefore, the invention provides, between a capacitive piezoelectric combustion pressure sensor and LPP signal processing circuitry, an operational amplifier with a negative feedback capacitor and input DC blocking capacitor, means generating a DC operating voltage applied to the amplifier non-inverting input, a voltage follower amplifier with a first resistor at its input and a second resistor at its output connecting it in parallel with the feedback capacitor, a DC filter capacitor connected to the input of the voltage follower amplifier and forming a low pass filter with the first resistor to maintain a substantially constant DC voltage equal to the DC operating voltage at the voltage follower amplifier input and therefore at the inverting input of the operational amplifier, current source means controlled by the output of the operational amplifier and connected in series with the first resistor to provide increased current for the charging of the DC filter capacitor and a diode bypassing the first resistor.

The operational amplifier with a DC blocking capacitor and negative feedback capacitor provides a low impedance buffer amplification for AC signals. The voltage follower with the low pass filter at its input connected to the output of the operational amplifier provides DC feedback to maintain the DC operating level of the operational amplifier. The current source means increases the current for DC feedback; and the diode bypass allows fast charging of the DC filter capacitor and DC blocking capacitor during startup.

The current source means may comprise a bipolar transistor having a base connected to the output of the operational amplifier and emitter and collector connected to provide current from a current supply to the feedback capacitor, DC filter capacitor and DC blocking capacitor at a rate controlled by the operational amplifier. Further details and advantages of this invention will be apparent from the accompanying drawings and following description of a preferred embodiment.

SUMMARY OF THE DRAWINGS

FIG. 3 is a circuit diagram of a peak detect circuit for use in the internal combustion engine of FIG. 1.

FIG. 4 is a circuit diagram of a diagnostic circuit for use in the internal combustion engine of FIG. 1.

FIG. 5 is a truth table illustrating the operation of the diagnostic circuit of FIG. 4.

DESCRIPTION OF THE PREFERRED EMBODIMENT

Figure 1:
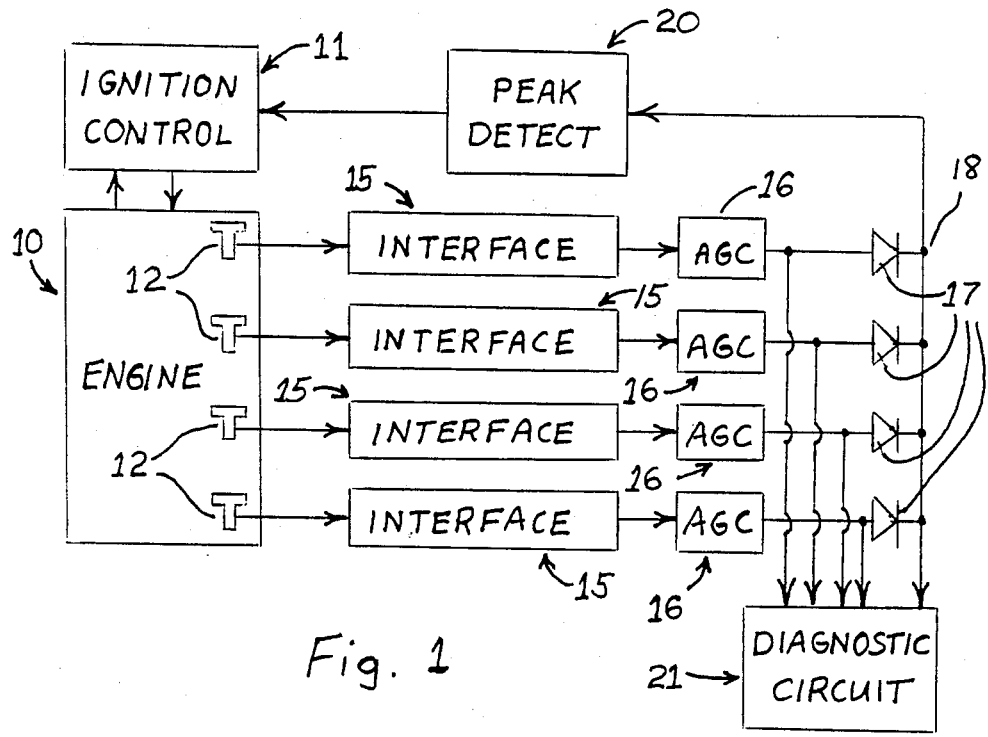
FIG. 1 is a block diagram of an internal combustion engine including an interface circuit according to the invention.

Referring to FIG. 1, an internal combustion engine 10 is of normal construction with a block, head, crankshaft and plurality of combustion chambers (4 in this embodiment). Engine 10 includes an ignition control 11 comprising, for example, spark plugs for the combustion chambers, ignition circuitry, distributor, and a timing reference generator of the type having a member rotating with the crankshaft and apparatus effective to generate pulses as the crankshaft rotates. From the latter apparatus, the ignition control derives the rotational speed of the crankshaft and a reference crankshaft position for each combustion chamber, from which the control knows at all times the rotational crankshaft position. Ignition control 11 may further include a digital computer programmed for control of the ignition timing and/or other characteristics. An example of an engine and ignition control of this type is shown in U.S. Pat. No. 4,231,091 to Motz, issued Oct. 28, 1980. Ignition control 11 may also include a knock control, if desired, of the type known in the prior art which responds to signals of a characteristic knock frequency to modify ignition timing from the normal value to reduce knock as required.

The combustion chamber pressure for each cylinder of engine 10 is sensed by one of a plurality of pressure sensors 12, which may be of the type comprising an engine headbolt with a head adapted to be strained by the stress of combustion pressure in the engine head. An example of such a sensor is shown in U.S. Pat. No. 4,491,010 to Brandt et al, issued Jan. 1, 1985. Other usable sensors include, not exclusively, piezoelectric force rings mounted under normal headbolts or combined with the spark plugs and separate piezoelectric or other capacitive sensors directly or indirectly sensing combustion chamber pressure.

Four such sensors are shown in this embodiment; and they are distributed so that at least one is adjacent each combustion chamber of engine 10. Each sensor 12 generates an electrical output signal from a piezoelectric generator, which signal appears on an output terminal connected through a low impedance interface circuit 15, an AGC circuit 16 and a diode 17 to a junction 18 of a highest wins network. The largest signal voltage, which during a combustion event will be the pressure of the cylinder undergoing combustion, is provided to a peak detector 20 capable of detecting at least the timing and optionally the value of peak combustion pressure. The output (or outputs) of peak detector 20 are fed back to ignition control 11 in an LPP ignition timing control of the general type shown in U.S. Pat. No. 4,481,925 to Karau et al, issued Nov. 13, 1984, U.S. Pat. No. 4,596,218 to Karau et al, issued June 24, 1986, or U.S. Pat. No. 4,601,197 to Fattic et al, issued July 22, 1986, in which ignition timing is continually adjusted, when possible, to maintain peak combustion pressure at a predetermined crankshaft angle. In addition, the outputs of AGC circuits 16 are provided, along with the highest wins signal from junction 18, to a diagnostic circuit 21 capable of providing some useful diagnostic information about the operation of engine 10, ignition control 11, sensors 12 and their connectors and cables, not shown. The outputs of interface circuits 15 may also be provided to the knock control if one is used.

Figure 2:
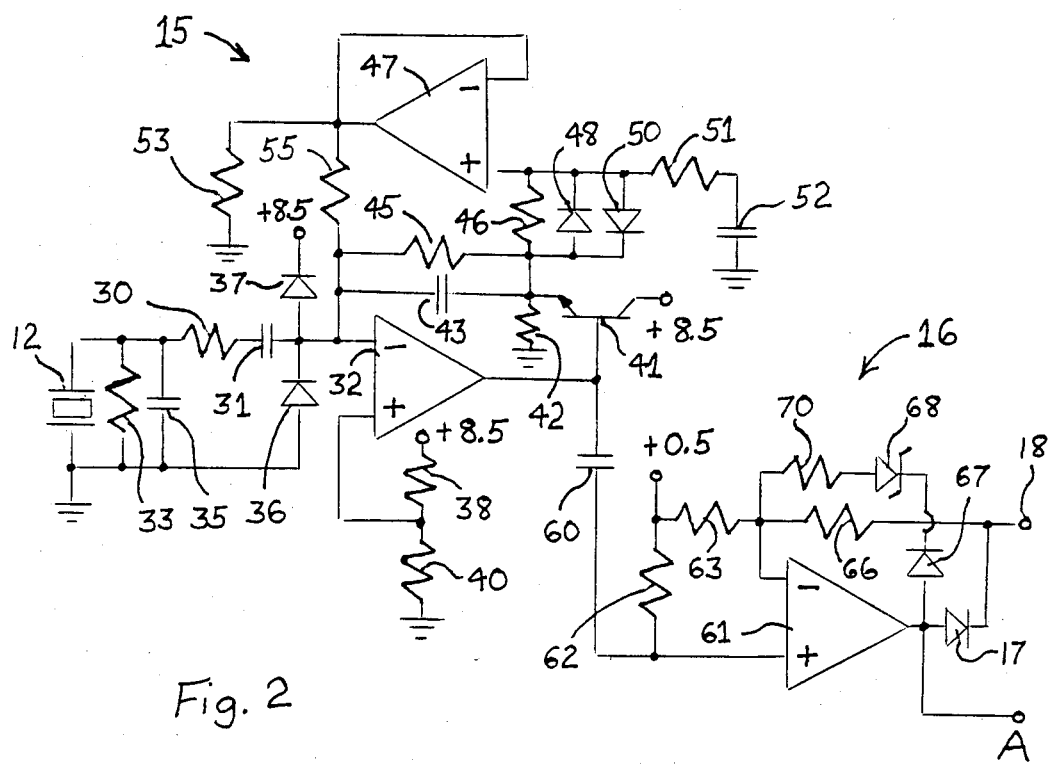
FIG. 2 is a circuit diagram of interface and AGC circuits for use in the internal combustion engine of FIG. 1.

FIG. 2 shows one of the interface circuits 15 and one of the AGC circuits 16. Interface circuit 15 is designed to present a low impedance to sensor 12 but maintain a bandwidth of 0.5 Hz to 20 KHz in the case of a system with LPP and knock sensing or 0.5 Hz to several KHz in the case of LPP only. Sensor 12 comprises, in equivalent circuit terms, a voltage source with a series capacitance of about 3900 pF. Sensor 12, symbolized by a piezoelectric element to stress the capacitance, has a grounded terminal and an output terminal connected through a resistor 30 (300) and DC blocking capacitor 31 (10 uF) to the inverting input of an operational amplifier (op amp) 32 (DM124). A resistor 33 (51K) to provide a DC ground for the high side of sensor 12 and a low pass filter capacitor 35 (0.001) are connected in parallel across sensor 12 as shown. The low pass filter 33, 35 has a high cutoff frequency to suppress high frequency noise and introduces no phase shift to the signals from sensors 12. Diode 36 from ground to the inverting input of op amp 32 and diode 37 from the inverting input to +8.5 volts provide input voltage limiting for the protection of op amp 32. The non-inverting input of op amp 32 is connected to the midpoint of a 50 percent voltage divider comprising series resistors 38 and 40 (15K) connected between +8.5 volts and ground to set the DC operating voltage for op amp 32 at 4.25 volts.

The output of op amp 32 is connected to the base of an NPN transistor 41 (2N4401) having a collector connected to +8.5 volts and an emitter connected through a resistor 42 (2K) to ground and also through a feedback capacitor 43 (0.1 uF) to the inverting input of op amp 32. There is a resistor 45 (10M) in parallel with capacitor 43 for amplifier stability. The emitter of transistor 41 is further connected through a resistor 46 (910K) to the non-inverting input of a voltage follower op amp 47 (2904) having an output connected in feedback to its inverting input. Oppositely directed diodes 48 and 50 are connected in parallel across resistor 46; and the non-inverting input of op amp 47 is connected through a resistor 51 (1K) and series capacitor 52 (100 uF) to ground. The output of op amp 47 is connected through a resistor 53 (2K) to ground and through a resistor 55 (15K) to the inverting inout of op amp 32.

Interface circuit 15 is designed to present a low impedance to sensor 12 so that the interconnecting cable will not act as an antenna in the noisy RFI environment of a vehicle engine and ignition system. The 10 uF capacitance of DC blocking capacitor 31 is much greater than the 3900 pF equivalent series capacitance of sensor 12, so that the closed loop gain of op amp 32 is determined by the ratio of sensor capacitance to feedback capacitance. Since the former is much less than the latter, the overall closed loop gain is much less than one. Thus, amplifier saturation is not a problem in the circuit.

The circuit uses resistor 46 and capacitor 52 as a low pass filter to average the output voltage of op amp 32 and feed it back to the input through the follower op amp 47 to maintain the DC voltage level constant as determined by the junction of resistors 38 and 40. Since the signal bandwidth of the circuit must extend downward to 0.5 Hz, the low pass filter for DC must have a long time constant—thus the large values for resistor 46 and capacitor 52. However, it is helpful when the system is started to speed up the charging of capacitor 52, as well as that of DC blocking capacitor 31. Therefore, transistor 41 provides a current multiplying effect through diode 48, which bypasses resistor 46 for faster charging of capacitor 52 until its voltage rises to within a diode drop of the desired voltage, resistor 51 providing a reduced current limitation. The faster charging also applies through the action of voltage follower 47 to capacitor 31. Resistor 55 prevents the input of op amp 32 from seeing the low output impedance of op amp 47 but must be small enough to allow the quick charging of capacitor 31 when the system is started. The goal of the circuit, once it is started and the voltage on the capacitors is up to the desired level, is that the DC level determining elements (46, 52, 47) do not affect the AC path of the signal processing elements (12, 32, 43). The signal causes the output of op amp 32 to vary in voltage according to the combustion pressure waveform without disturbing the DC or average voltage level of the circuit.

The output of interface circuit 15, which is the output of op amp 32, is connected through a DC blocking capacitor 60 (4.7 uF) to the non-inverting input of an op amp 61 (DM124), which input is also tied through a resistor 62 (330K) to +0.5 volts. These elements provide a lowered reference voltage of 0.5 volts for the signal for more headroom, since it is the area of the pressure curve near the peak which is to be preserved and the lower portion of the pressure curve is expendable. The inverting input of op amp 61 is also connected through a resistor 63 (5.1K) to +0.5 volts. The output of op amp 61 is connected to a diagnostic output terminal A and is also connected in feedback to the inverting input through diode 17 and resistor 66 (200K) in series. The output is further connected in feedback to the inverting input through a diode 67, zener diode 68 and resistor 70 (51K) in series. The cathode of diode 17 is the signal output 18 to peak detector 20. Thus, a compound feedback loop is provided for a reduction in gain for signals exceeding the voltage of the zener diode. This further assists the circuit in preventing clipping of the peak of large pressure curves. Although it distorts the amplitude of large pressure peaks, there is only a two valued choice of gain parameters; and a signal may be derived from the voltage across diode 67 or zener diode 68 to trigger an amplitude correction factor in any circuitry that makes use of the amplitude information.

Peak detect circuit 20 is shown in FIG. 3. An input terminal 72 is connected through a low pass filter, comprising a series resistor 73 (47K) and a capacitor 75 (220 pF) to ground, to the non-inverting input of an op amp 76. The output of op amp 76 is connected through a resistor 77 (10K) to the base of an NPN transistor 78 (2N4401) having a collector connected to +8.5 volts and an emitter connected back to the inverting input. The emitter of transistor 78 is further connected through a resistor 80 (150) and capacitor 81 (0.27) in series to ground, as well as to the non-inverting inputs of op amps 82 and 83. Op amp 82 is connected as a voltage follower with negative unity feedback; and has an output connected to a voltage divider comprising resistors 85 (850) and 86 (1K), from the junction of which a peak pressure value PLV is obtained in a manner to be described. Op amp 83 has an inverting input connected to the output of op amp 76 and an output connected to a voltage divider comprising resistors 87 (850) and 88 (1K), from the junction of which a peak pressure location signal PPLOC is obtained in a manner to be described.

The non-inverting input of op amp 76 is connected to ground through a switch 90, which is one quarter of a quad electrically controlled solid state switch chip (4066). The inverting input of op amp 76 is connected to ground through a switch 91 which comprises another quarter of the chip. Both switches 90 and 91 are controlled by the output of a comparator 92 (2903) connected with a tie up resistor 93 (10K) from its output to +8.5 volts. The inverting input of comparator 92 is connected to +0.6 volts; and the non-inverting input is connected through a resistor 95 (10K) to ground and to a terminal which receives a WINDOW signal.

In operation, a WINDOW signal is generated by ignition control 11 as a high voltage level except during a predetermined combustion window of crankshaft rotation in which peak combustion pressure is expected, during which window a ground voltage is generated. When the window is not present, switches 90 and 91 are closed in response to comparator 92 to allow capacitors 75 and 81 to discharge to ground level and reset the circuit. When the window begins, switches 90 and 91 open; and the signal voltage is applied to op amp 76 through the low pass filter 73, 75, which has a high cutoff frequency to remove high frequency noise in the interest of better peak detection and which does not introduce any phase shift at the frequencies of the combustion pressure waveform. With transistor 78 conducting, the output of op amp 76 is at least one diode drop higher in voltage than the emitter of transistor 78, so that the output of op amp 83 goes low. Capacitor 81 charges to follow the voltage of the waveform upward. The voltage on capacitor 81 is fed back to op amp 76. Therefore, when the waveform reaches a peak and begins to decrease, the output of op amp 83 switches high to generate a leading edge pulse in signal PPLOC indicating the occurrence of peak pressure. The voltage on capacitor 81 stops increasing and remains essentially constant. Ignition control 11 includes means triggered by the PPLOC pulse to read a real time clock or crankshaft rotation value and store it in a memory location.

Another excursion of the pressure waveform at terminal 72 above the voltage stored on capacitor 81 causes the voltage on capacitor 81 to increase further and PPLOC to again go low. When a new peak is reached, PPLOC goes high again; and the old clock or crankshaft rotation value in ignition control 11 memory is replaced with a new one. The new high voltage remains on capacitor 81. This continues until the window is closed, at which time the stored clock or crankshaft rotation value is kept as the location of the final, and therefore highest, peak. The value of PLV may be read with each new peak and stored or read as a final value just before the end of the window. When the window ends, switches 90 and 91 are again closed to reset the circuit.

The diagnostic capabilities of this circuit are based on the fact that, in the highest wins arrangement of diodes 17, the combustion chamber which is currently firing and which thus produces the currently increasing pressure signal provides the highest voltage to its diode 17; and this voltage forward biases that diode and, through feedback to the operational amplifiers, reverse biases the diodes 17 of all the other interface circuits. Thus a signal of the currently firing cylinder is available if the cylinder can be identified. The diagnostic circuit of FIG. 4 provides this identification. Referring to FIG. 2, if a sensor other than sensor A has the highest output voltage, the voltage on summing junction 18 fed back through resistor 66 to the inverting input of op amp 61 is too high for the signal input on the non-inverting input and thus causes the output of the op amp to decrease substantially. This reverse biases diode 17 for this op amp and sensor. Only a slight voltage difference (a few microvolts) between the summing junction voltage and the input voltage is sufficient to produce the required voltage decrease at the output for reverse bias. The same thing happens to all the diodes 17 except for that associated with the sensor having the maximum signal voltage.

A logic circuit for detecting the forward biased diode is shown in FIG. 4. Op amps 100, 102 and 103 are provided at their inverting, non-inverting and non-inverting inputs, respectively, with signals A, C and D, respectively, from the anodes of diodes 17 in three of the four interface circuits 15. Signal A was described with reference to FIG. 2; and the others are analogous. There is no need for signal B in this optimized logic circuit, although alternative circuits, less optimal, which require B could be envisioned by one skilled in the art. The non-inverting input of op amps 100 and 101 and the inverting inputs of op amps 102 and 103 are connected to junction 18, so that op amps 100, 102 and 103 are placed across diodes 17 of interface circuits A, C and D. The inverting input of op amp 101 is connected to the output of op amp 102. The outputs of op amps 100 and 101 are connected through a resistor 105 (20K) to +5 volts and to both inputs of an OR gate 106 having an output labeled X. Since the op amps are of the open collector output type, this connection comprises an AND gate for the outputs of op amps 100 and 101. The outputs of op amps 102 and 103 are connected through resistors 107 and 108, respectively, to +5 volts and to the inputs of an OR gate 110 having an output labeled Y. The logic of the circuit is illustrated in the truth table of FIG. 5, in which the values of X and Y are shown for each sensor 12. The outputs X and Y may be read by ignition control 11 at a convenient time, such as TDC or the first peak thereafter; and the two bit code stored in memory.

With the information as to which cylinder is firing at any time, individual information may be compiled for each cylinder. Such information may include individual cylinder LPP, pressure rise and percent peak detects. From these statistics, the following failures can be deduced:

1. One cylinder's average LPP is at TDC while the others are later: misfire of the one cylinder.

2. A sensor serves two cylinders, but no peak detects are detected for one: misfire of the one.

3. A sensor serves two cylinders, but no peak detects are detected for either: bad sensor or connection.

4. With reference to additional information in ignition control 11, the wrong sensor is active during a given time: bad sensor or, if the sensor serves two cylinders and one gives good peak detects, misfire.

5. Indication of wrong sensor on several cylinders: out of sync or sensors connected improperly.

In general, a misfire will generate very low (advanced) LPP values, a bad sensor or connection will generate no peak detects and a good peak will show a noticeable rise in voltage from TDC to peak (low average LPP values excluded). The errors may be logged and indicated to the vehicle operator by means of malfunction codes. In addition, if a sensor or cylinder is found to be operating improperly, proper action can be taken to minimize any effect the defect may cause, such as leaving a misfiring cylinder out of control calculations, for example.

The part number DM124 given for various op amps in this specification is a Delco Electronics Corporation (R) number. An equivalent part is CA3260.

The embodiments of the invention in which an exclusive property or privilege is claimed are defined as follows:

1. A low impedance interface circuit for LPP signal processing circuitry in an internal combustion engine comprising, in combination:
   a capacitive piezoelectric combustion pressure sensor;
   an operational amplifier with a feedback capacitor in negative feedback and means generating a DC operating voltage applied to the non-inverting input thereof;
   an input DC blocking capacitor connecting the sensor output to the inverting input of the operational amplifier;
   a voltage follower amplifier with a first resistor at its input and a second resistor at its output connecting it in parallel with the feedback capacitor in negative feedback around the operational amplifier;
   a DC filter capacitor connected to the input of the voltage follower amplifier and forming a low pass filter with the first resistor to maintain a substantially constant DC voltage equal to the DC operating voltage at the voltage follower amplifier input and therefore at the inverting input of the operational amplifier, the voltage follower thus providing DC feedback and the feedback capacitor providing AC signal feedback for the operational amplifier;
   current source means controlled by the output of the operational amplifier and connected in series with the first resistor to provide increased current for the charging of the DC filter capacitor; and
   a diode bypassing the first resistor to allow fast charging of the DC filter capacitor and DC blocking capacitor during startup.

2. The low impedance interface circuit of claim 1 wherein the current source means comprises a current supply means at a supply voltage and a bipolar transistor with a base connected to the output of the operational amplifier, an emitter and a collector one of the emitter and collector being connected to the current supply means and the other of the emitter and collector being connected to ground through a third resistor, to the feedback capacitor and to the first resistor.

* * * * *